US008998284B1

(12) United States Patent
Minahan et al.

(10) Patent No.: US 8,998,284 B1
(45) Date of Patent: Apr. 7, 2015

(54) ICE FISHING HOUSE WITH TRACKED DRIVE, MOVABLE FLOOR, AND REMOTELY CONTROLLED AUGER

(71) Applicants: Russell P. Minahan, Saint Cloud, MN (US); Raymond P. Minahan, Ortonville, MN (US)

(72) Inventors: Russell P. Minahan, Saint Cloud, MN (US); Raymond P. Minahan, Ortonville, MN (US)

( * ) Notice: Subject to any disclaimer, the term of this patent is extended or adjusted under 35 U.S.C. 154(b) by 0 days.

(21) Appl. No.: 14/304,517

(22) Filed: Jun. 13, 2014

Related U.S. Application Data

(60) Provisional application No. 61/834,875, filed on Jun. 13, 2013.

(51) Int. Cl.
| | |
|---|---|
| *B60P 3/34* | (2006.01) |
| *A01K 97/01* | (2006.01) |
| *B60P 3/32* | (2006.01) |
| *B60P 3/36* | (2006.01) |
| *E04H 15/00* | (2006.01) |

(52) U.S. Cl.
CPC . *A01K 97/01* (2013.01); *B60P 3/32* (2013.01); *B60P 3/36* (2013.01); *E04H 15/001* (2013.01); *Y10S 135/901* (2013.01)

(58) Field of Classification Search
USPC ........ 296/165, 164, 171–173, 175, 176, 24.3, 296/26.01, 26.04–26.07, 184.1, 25; 135/88.03, 88.13, 88.01, 901
See application file for complete search history.

(56) References Cited

U.S. PATENT DOCUMENTS

| | | | |
|---|---|---|---|
| 2,473,076 A | 6/1949 | Scheibner | |
| 2,734,722 A | 2/1956 | Pokorny | |
| 3,464,735 A | 9/1969 | Smith | |
| 3,599,740 A | 8/1971 | Martinmaas | |
| 3,602,321 A * | 8/1971 | Kortschaga | 175/18 |
| 3,603,419 A | 9/1971 | Riddle | |
| 3,622,175 A | 11/1971 | Benz et al. | |
| 3,731,751 A * | 5/1973 | Rusco | 173/26 |
| 3,877,533 A | 4/1975 | Maziarka et al. | |
| 4,403,802 A * | 9/1983 | Jones | 296/25 |
| 5,092,721 A * | 3/1992 | Prince | 410/26 |
| 5,536,131 A * | 7/1996 | Behr | 414/495 |
| 5,622,198 A * | 4/1997 | Elsinger | 135/128 |
| 5,622,235 A | 4/1997 | Merritt | |
| 5,720,312 A | 2/1998 | Scheuermann | |
| 5,746,277 A * | 5/1998 | Howell, Jr. | 173/184 |
| 6,155,279 A * | 12/2000 | Humphrey | 135/87 |
| 6,439,645 B1 | 8/2002 | Pedersen | |
| 6,742,612 B2 | 6/2004 | Campbell et al. | |
| 6,802,327 B2 | 10/2004 | Koss | |
| 6,889,779 B2 * | 5/2005 | Skarlupka et al. | 173/184 |
| D510,541 S | 10/2005 | Buchanan | |
| 6,962,221 B1 * | 11/2005 | Carrette | 180/9.1 |

(Continued)

OTHER PUBLICATIONS

"SnoBear", Apr. 17, 2013, http://www.snobearusa.com/?q=node/59, Snobear Industries LLC, 1 page.

(Continued)

*Primary Examiner* — Gregory Blankenship
(74) *Attorney, Agent, or Firm* — Albert W. Watkins (57) ABSTRACT

A fully enclosed and self-propelled ice fishing house is operable from within the enclosure to control a tracked drive, a vertically movable floor, and vertical movement of an exterior auger. The movable floor may be raised for transport and lowered to the surface of the ice during fishing. The exterior auger is preferably in front of the vehicle, and a line parallel to a longitudinal axis of the vehicle extends from the auger to a fishing opening portal in the movable floor.

10 Claims, 5 Drawing Sheets

(56) References Cited

U.S. PATENT DOCUMENTS

| | | | |
|---|---|---|---|
| 7,322,627 B1* | 1/2008 | Nicholson | 296/25 |
| 7,487,734 B2 | 2/2009 | Davis | |
| 7,503,607 B2 | 3/2009 | Sersland et al. | |
| 8,550,100 B1* | 10/2013 | Lindholm | 135/96 |
| 2004/0055630 A1* | 3/2004 | Olson | 135/901 |
| 2004/0216395 A1* | 11/2004 | Wentworth, Jr. | 52/79.5 |
| 2005/0173944 A1* | 8/2005 | Blair | 296/164 |
| 2005/0205298 A1* | 9/2005 | Kollasch et al. | 175/18 |
| 2005/0253417 A1* | 11/2005 | Cundy | 296/168 |
| 2010/0307550 A1* | 12/2010 | Silverberg et al. | 135/116 |
| 2012/0211042 A1* | 8/2012 | Richter | 135/143 |

OTHER PUBLICATIONS

"Yooper Crawler: A Self propelled ice fishing shanty", Apr. 19, 2013, R & I Manufacturing, http://www.yoopercrawler.com/, 3 pages.

"StomperTech", Apr. 17, 2013, Stompertech Industries, http://stompertech.com/, 6 pp.

\* cited by examiner

ICE FISHING HOUSE WITH TRACKED DRIVE, MOVABLE FLOOR, AND REMOTELY CONTROLLED AUGER

CROSS REFERENCE TO RELATED APPLICATIONS

This application claims the benefit under 35 USC 119(e) of U.S. provisional 61/834,875, filed Jun. 13, 2013, the contents incorporated herein by reference in entirety.

BACKGROUND OF THE INVENTION

1. Field of the Invention

This invention pertains generally to motor vehicles, and more particularly to motor vehicles having an endless flexible track structure, a vehicle frame and motive power and drive means for the flexible track. In a preferred manifestation, the present invention is a fully enclosed ice fishing house which is operable from within the enclosure to control a tracked drive, movable floor, and exterior auger.

2. Description of the Related Art

In northern latitudes, during the long winters there is no ability to grow or harvest plants. However, many of the deeper or spring-fed lakes maintain water below ice, and fish are able to survive the winter months. Consequently, many lakes in the northern latitudes hold bounties of fish, and these fish have long served as an essential source of food.

In addition to fulfilling a basic need for food, many people today find fishing to be a very enjoyable recreational sport. In some cases this may simply be a return to one's roots, or a refreshing visit to what times of old involved. In other cases, the combination of time in the relatively unspoiled outdoors and the opportunity to meet one's basic needs combine to provide great satisfaction. In yet other cases, the time away from hectic life in the city and opportunity to socialize in a more private environment provides an excellent change of pace. Regardless of the specific reasons, millions of individuals at least on occasion continue to participate in the sport.

When a fisherman embarks upon a fishing trip, whether for an afternoon or a multiple day trip, one part of the preparation is the securing of supplies. Frequently, a fisherman will carry many diverse tools, such as an ice auger, various live and artificial baits, hooks, leaders, weights, bobbers, stringers, and the like.

Once supplies have been gathered, an ice fisherman will travel to a suitable location on the ice surface of a suitable lake. The fisherman will then create a hole through the ice into the water, typically by drilling with an ice auger. Next, the fisherman will pass a fishing line terminated by an artificially or live-baited hook through the hole. The fisherman then waits for an unsuspecting fish to bite or swallow the bait, and then the fisherman will reel the line in and pull the fish through the hole in the ice.

Ice fishing involves sometimes waiting for extended time periods for fish to bite. Unfortunately, by the very nature of the location on top of the ice, there is generally little natural shelter available to protect a fisherman from the elements. Consequently, the combination of cold temperatures and wind can be quite brutal. When temperatures fall below zero on the Fahrenheit scale, and when the winds begin to blow, frostbite occurs in only a few minutes on exposed skin. Severe winter weather can make an otherwise very enjoyable past time into a brutal and life threatening experience.

Snow that requires substantial exertion to walk through and slippery ice are both covering the lakes, making access by foot travel physically challenging and risky. Difficult foot access and the risk of life threatening exposure to the elements combine to create an obstacle or barrier for elderly or handicapped individuals that would otherwise gain great enjoyment and satisfaction from the sport of ice fishing.

A shelter, commonly referred to as an ice house or ice shanty, may be used to protect a fisherman from extreme cold and possible wind gusts. Many ice houses may also be provided with a source of heat, light, and a radio, television, or other entertainment system. Understandably, such ice houses have gained wide acceptance.

Unfortunately, ice houses tend to be heavy, awkward, and not readily transported. Consequently, ice houses can be especially difficult to set up in remote locations. Even for more accessible locations, typical ice houses pose difficulties in transportation and tend to be left in one location all winter.

As is well-known, fish are not predictable, and may move from day to day to different locations about the lake. A fixed ice houses cannot be moved to better fishing locations, while a portable shelter could. Consequently, for a fisherman to have the option of moving to a different location on the ice is of benefit in the art of ice fishing.

Other complications can arise when the ice house is left out all winter. For example, snow and ice can build up inside of the ice houses, making the floor slippery. Another complication arises if the top layer of ice melts on a particularly warm day because the ice house can become frozen to the lake when it re-freezes, making removal difficult or impossible until the lake starts melting again. Also, if the weather warms up significantly before one has a chance to retrieve the ice house, the ice house will be irretrievable and end up at the bottom of the lake. Furthermore, in order to even get a traditional ice house on the lake can require a larger vehicle, such as a truck, to drive out onto the ice. In addition, supplies left within the ice house may be stolen or vandalized.

Some artisans have designed portable enclosures that may be transported across ice and snow. Exemplary patents, the contents and teachings which are incorporated herein by reference, include U.S. Pat. No. 3,464,735 by Smith, entitled "Snowmobile camper"; and Des 510,541 by Buchanan, entitled "Ice transporter". These enclosures provide protection from the elements and may be towed by other vehicles. However, other than shelter, they are of little utility to an ice fisherman since they do not provide shelter while still also providing access through the ice to fish.

Several additional towable enclosures provide access to the ice and submerged fish, including U.S. Pat. No. 2,473,076 by Scheibner, entitled "Collapsible structure for ice fishing"; and U.S. Pat. No. 7,487,734 by Davis, entitled "Convertible multipurpose recreational assembly", the teachings and contents of each which are incorporated herein by reference. These greatly facilitate the travel to and from different locations upon the ice through the use of a motorized towing vehicle such as an ATV, snowmobile, or other vehicle. However, the fisherman must still drive the towing vehicle, connect and disconnect therefrom, drill a suitable hole, and in the case of the Sheibner patent load and unload supplies and gear from the shelter. Each of these requirements make the experience less enjoyable, and also much more difficult for elderly or disabled individuals.

As an alternative, some artisans have designed ice fishing shelters that are transported and supported by a snowmobile. Exemplary patents, the contents and teachings which are incorporated herein by reference, include: U.S. Pat. No. 5,720,312 by Scheuermann, entitled "Collapsible shelter, and methods of constructing and utilizing same"; and U.S. Pat. No. 6,962,221 by Carrette, entitled "Mobile ice fishing shelter assembly". In a similar manner, other artisans have designed shelters for All-Terrain Vehicles (ATVs) and the like. Exemplary patents, the contents and teachings which are incorporated herein by reference, include: U.S. Pat. No. 6,439,645 by Pedersen, entitled "Mobile all-terrain vehicle enclosure"; U.S. Pat. No. 6,802,327 by Koss, entitled "Retractable portable shelter with an attachment for vehicles"; and U.S. Pat. No. 7,503,607 by Sersland et al, entitled "Retractable enclosure for small land vehicle". Other artisans have designed simpler enclosures for snowmobiles, without any consideration at all for other utility. Exemplary patents, the contents and teachings which are incorporated herein by reference, include: U.S. Pat. No. 3,599,740 by Martinmaas, entitled "Snowmobile cab assembly"; U.S. Pat. No. 3,603,419 by Riddle, entitled "Combination cover and trailing sleigh for traction snow vehicles"; U.S. Pat. No. 3,622,175 by Benz et al, entitled "Safety canopy for snowmobiles"; and U.S. Pat. No. 3,877,533 by Maziarka et al, entitled "Snowmobile steering mechanism". Unfortunately, none of these concepts alleviate the need for a fisherman to be significantly exposed to the elements, and potentially need significant strength and capability.

Finally, a few artisans have tried to facilitate the use or transport of an auger. Exemplary patents, the contents and teachings which are incorporated herein by reference, include: U.S. Pat. No. 2,734,722 by Pokorny, entitled "Post hole driller"; U.S. Pat. No. 3,602,321 by Kortschaga, entitled "Ice auger attachment for snow vehicles"; U.S. Pat. No. 3,731,751 by Rusco, entitled "Power driven auger attachment for snowmobiles"; U.S. Pat. No. 5,622,235 by Merritt, entitled "Tracked vehicle"; U.S. Pat. No. 5,746,277 by Howell, entitled "Drilling apparatus"; U.S. Pat. No. 6,742,612 by Campbell et al, entitled "Offroad tracked vehicle for snow and ice"; and U.S. Pat. No. 6,889,779 by Skarlupka IV et al, entitled "Auger/vehicle interface jig".

In addition to the aforementioned patents, several commercial machines exist that greatly facilitate access to ice fishing. These include the StomperTech ATRV all season off-road ice fishing, camping, hunting, and rescue vehicle from StomperTech Industries Incorporated of Clearwater, Minn.; the Yooper Crawler self propelled ice fishing shanty from R & I Manufacturing of Gulliver Mich.; and the SnoBear mobile fish house by SnoBear Industries of West Fargo, N. Dak.; the teachings of each which are incorporated herein by reference. These machines each provide a number of features and advantages that are very significant and beneficial when compared to the patents incorporated by reference herein above. Nevertheless, there remains a need for a particular combination of features that these machines do not achieve.

One challenge with a mobile and self contained shelter is achieving appropriate balance between ground clearance, ease of use for ice fishing, and cost. More specifically, the Yooper Crawler provides good ground clearance while preserving relatively simpler and lower cost construction than, for exemplary purposes, the SnoBear. However, the Yooper Crawler also elevates the floor of the fish house above the ice by the same clearance between the fish house floor and the ski bottoms. In other words, when more clearance is provided to traverse heavier snow coverings, this same clearance is a hindrance for the fisherman later since this creates an undesirable gap between fish house floor and the ice surface. In addition, an elderly or handicapped fisherman must also climb a ramp to gain sufficient elevation to reach the interior floor of the shelter. Consequently, the more transportable the shelter, the less desirable is use for ice fishing.

In contrast to the Yooper Crawler, the SnoBear provides an Acralift System that allows the machine to lower and raise through a twelve inch range, allowing the machine to raise above a heavy snow during transport, while still lowering down to an ice surface for fishing. While this is a very innovative and highly beneficial system, the complexity necessarily adds undesirable cost, and the amount of available elevation gain for transport is still more limited than may be desired for some applications.

Thus there still exists a need and opportunity for a more complete and comprehensive set of features and benefits, while minimizing the detrimental aspects of the prior art.

In addition to the foregoing patents and publications, Webster's New Universal Unabridged Dictionary, Second Edition copyright 1983, is incorporated herein by reference in entirety for the definitions of words and terms used herein.

SUMMARY OF THE INVENTION

In a first manifestation, the invention is a mobile ice-fishing house. A body defines a body interior and is adapted to operatively isolate the body interior from an exterior and thereby shelter a person within the body interior. The body has a vertically movable floor. Controls within the body interior are adapted to operatively control vertical movement of the vertically movable floor. A drive train is adapted to operatively move the ice fishing house between different and distinct locations upon an ice surface. Controls within the body interior are adapted to operatively control movement of the drive train. An ice auger is exterior to the body. Controls within the body interior are adapted to operatively control vertical movement of the ice auger.

OBJECTS OF THE INVENTION

Exemplary embodiments of the present invention solve inadequacies of the prior art by providing a fully enclosed and self-propelled ice fishing house which is operable from within the enclosure to control a tracked drive, movable floor, and exterior auger. The movable floor may be raised for transport and lowered to the surface of the ice during fishing. The exterior auger is preferably in front of the vehicle, and a line parallel to a longitudinal axis of the vehicle extends from the auger to a fishing opening in the movable floor.

The present invention and the preferred and alternative embodiments have been developed with a number of objectives in mind. While not all of these objectives are necessary for every embodiment, these objectives nevertheless provide a sense of the general intent and the many possible benefits that are available from embodiments of the present invention.

A first object of the invention is to provide a self-contained and powered ice fishing shelter. A second object of the invention is to allow an operator to increase and decrease ground clearance at will, thereby permitting the ice fishing shelter to have adequate ground clearance when moving, and minimal ground clearance when stationary to facilitate ice fishing. Another object of the present invention is to provide ground level entry into and exit from the interior A further object of the invention is to enable an operator from the interior to drill a hole in the ice, using an exterior auger, and drive the vehicle straight forward to align with an opening in the movable floor. Yet another object of the present invention is to enable the vehicle to traverse irregular surfaces, including but not limited to snow plow ridges, and ice breaks and mounds along shore lines. An additional object of the invention is to provide an ice fishing shelter of only moderate cost, thereby encouraging a greater number of persons to partake in the sport of ice fishing.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
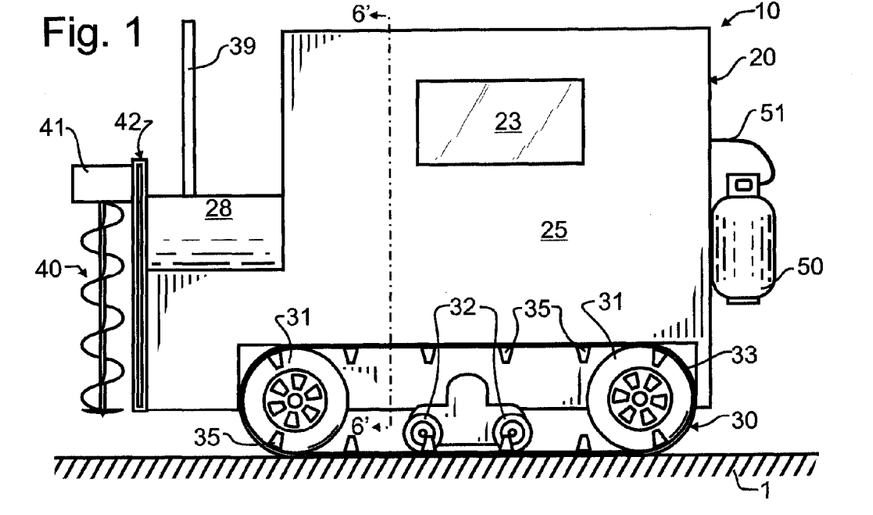
FIG. 1 illustrates a preferred embodiment ice-fishing house designed in accord with the teachings of the present invention from an exterior side elevational view.
Figure 2:
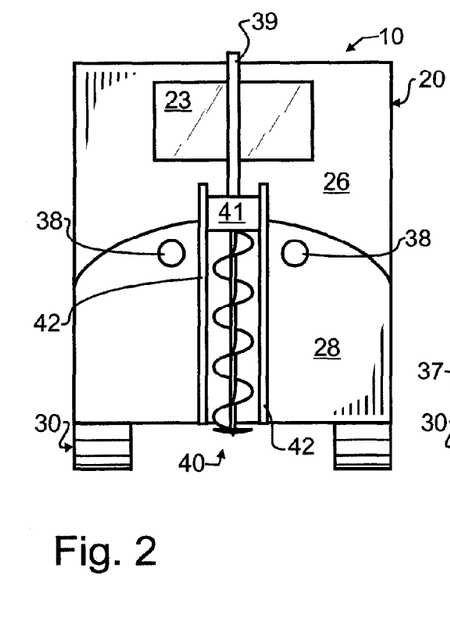
FIG. 2 illustrates the preferred embodiment ice-fishing house of FIG. 1 from an exterior front elevational view.

In a preferred embodiment of the invention illustrated in the Figures, a self-propelled ice-fishing house 10 is operative to traverse a surface 1 such as dirt, pavement, snow or ice. Self-propelled ice-fishing house 10 has a body 20 generally defining and creating a body interior 21 sheltered from the exterior environment. A drive train 30, in the preferred embodiment for exemplary purposes only and not solely limiting thereto, has two drive wheels 31 and two idler wheels 32 provided on each side that engage with a drive track 33. A smaller and lower projected portion 28 on the front of the body 20 houses an engine and other necessary mechanics as is understood in the art, and further supports an auger 40. A propane tank 50 may be provided on the back side 27. One or more viewing windows 23 of any suitable size and locations may preferably be provided on side walls 25 as illustrated in FIGS. 1-2. These windows provide visibility while operating, entering or leaving the vehicle, or enjoying the comforts of the sheltered body interior 21, and may be provided with optional window coverings.

Figure 3:
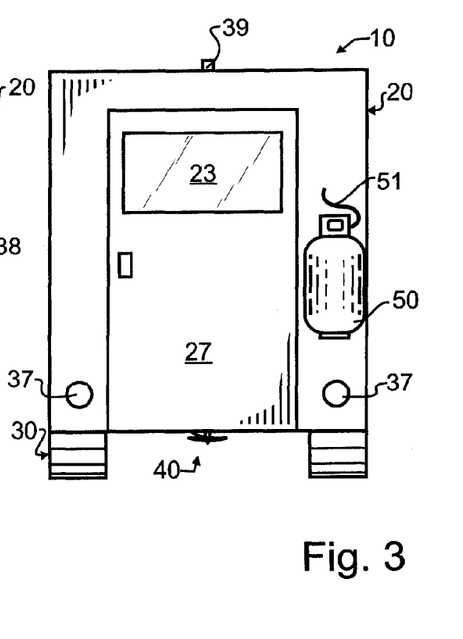
FIG. 3 illustrates the preferred embodiment ice-fishing house of FIG. 1 from an exterior back elevational view.

A propane tank 50 is preferably affixed to the back side 27 of ice-fishing house 10, and will necessarily be provided with a hose 51 to transport propane into the ice-fishing house 10 as illustrated in FIGS. 1 and 3. The propane may be used as a fuel source for a heater, and may also optionally be used as the fuel source for the engine, where the engine has been so adapted. Hose 51 allows the fuel to be distributed to one or more appliances and engines as desired, and may further be provided with a valve in the body interior 21 compartment to control the flow of fuel. This is beneficial because the user does not need to exit the vehicle in order to activate various appliances and engines, saving energy since trapped heat does not escape from body interior 21, thereby ensuring greater user comfort.

In alternative embodiments, various appliances may be provided, for exemplary purposes only and not solely limiting thereto including gas or electric refrigerators, stoves and ovens, electric heaters, or other devices or apparatus deemed to be beneficial. Likewise, alternate heat and fuel sources may be used, again for exemplary purposes only and not solely limiting thereto, including gasoline, electricity provided through the utility grid or produced through solar photovoltaic or wind conversion and whether stored in batteries or directly used, or any other suitable sources of energy, and heat produced from solar thermal panels or provided directly from engine cooling with or without a liquid coolant.

Taillights 37 and headlights 38 are preferably affixed to the back side 27 and front side 26, respectively, as illustrated in FIGS. 3 and 2. These may take any shape or form, but may preferably provide safety lighting as is mandated in order for the vehicle to be road safe. Whether meeting road requirements or otherwise, lighting is very desirable to allow the preferred embodiment ice-fishing house 10 to be safely driven at night or twilight, or other low-light conditions.

As FIG. 1 illustrates, preferred embodiment ice-fishing house 10 has four wheels on each lateral side, with two drive wheels 31 and two idler wheels 32. The wheels are coupled with a drive track 33. Track 33 provides added friction and stability when driving on a variety of surfaces, including those that contain snow or ice, and also assists with climbing plow ridges and the like. Belt teeth 35 keep track 33 in alignment with and frictionally engaged with drive wheels 31. Drive wheels 31 are turned by the engine, while the idler wheels 32 spin with movement of track 33, instead of being powered by the drive engine. Idler wheels 32 help to keep track 33 engaged with the ground surface 1, aiding with traction and in keeping track 33 in proper position. In alternative embodiments, different wheels may be used, including wheels without tracks or snow-gripping wheels, or one or more of the wheels may be replaced with other apparatus, such as with skis as seen on snowmobiles or other suitable runners.

Figure 4:
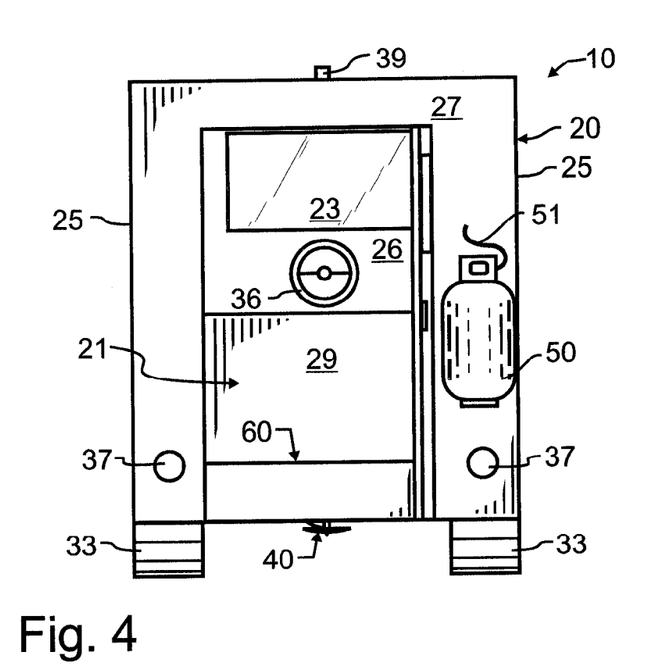
FIGS. 4 and 5 illustrates the preferred embodiment ice-fishing house of FIG. 1 from an exterior back elevational view with the entry door open to reveal the movable floor in an elevated position for transport, and in a lowered position for ice fishing, respectively.
Figure 5:
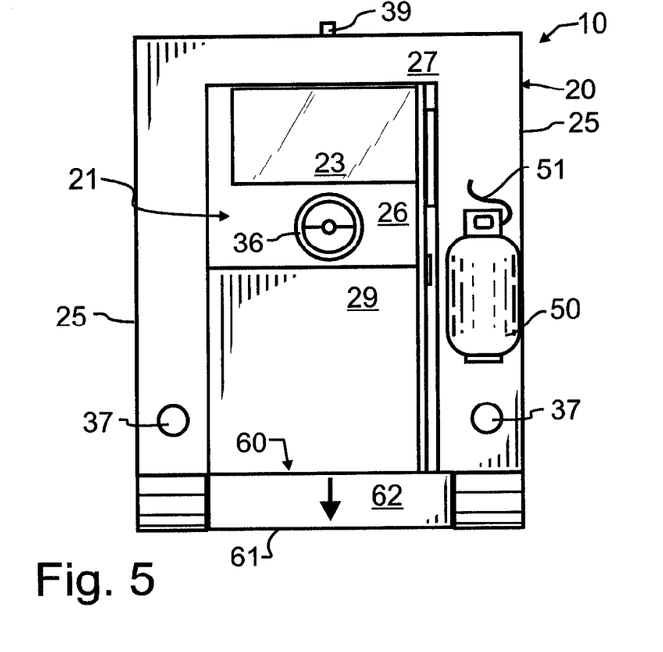

Preferred embodiment ice-fishing house 10 has a floor box 60 defining the bottom body interior 21 of ice-fishing house 10, as seen in FIGS. 4-8. The preferred floor box 60 has a horizontal, rectangular surface forming a base 61, and may be provided with a perpendicular and vertically rising surface on each edge, altogether totaling four relatively short side walls 62. The base 61 and side walls 62 together form a shape resembling a box without a top. This preferred floor box 60 can be raised for transportation as illustrated in FIG. 4 and lowered to the ground surface for ice fishing, as seen in FIG. 5. The side walls 62 of floor box 60 provide protection from the exterior weather, allowing ice-fishing house 10 to retain heat and conserve energy used in heating, regardless of whether in the raised or lowered positions of FIGS. 4 and 5, respectively. Additionally, side walls 62 of the floor box 60 also block incidental light that may come through, allowing the user to moderate the lighting through the use of window coverings and man-made light. Side walls 62 also act as a linear bearing, guiding floor box 60 up and down while side walls 62 each remain parallel to adjacent body side walls 25.

In an alternative embodiment, floor box 60 may be provided with fewer side walls 62. More particularly, if the side wall 62 closest to the back side 27 of ice fishing house 10 is omitted, and floor box 60 is lowered so that base 61 is adjacent to ground surface 1, then a person or wheel chair will be able to enter directly into body interior 21 at ground level. They would only have to climb the thickness of base 61, without any further hindrance or obstacles, which would appear similar to the view of FIG. 6. As may be apparent, the number, size, and shape of side walls 62 can be varied depending upon the needs of a particular application.

Figure 7:
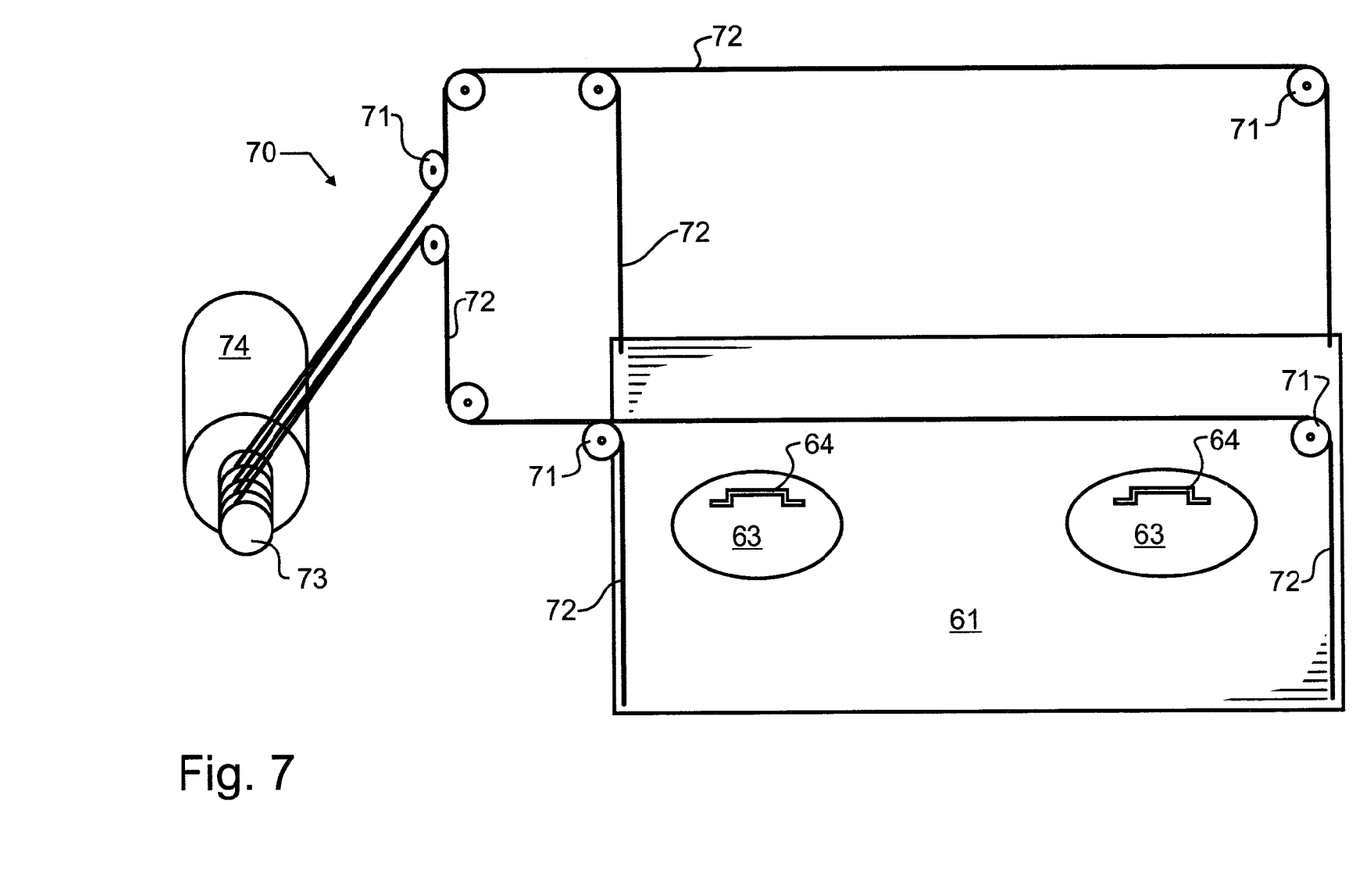
FIG. 7 illustrates a preferred embodiment drive used to raise and lower the preferred embodiment floor box used in the ice-fishing house of FIG. 1 from a projected view and with components not necessary to the understanding of the operation removed for illustrative purposes.
Figure 8:
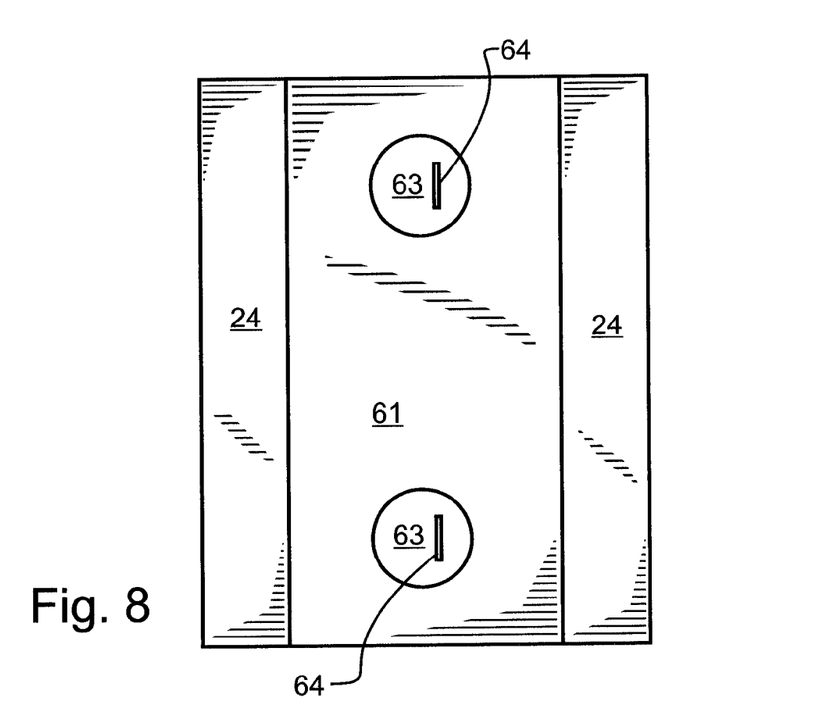
FIG. 8 illustrates a preferred embodiment floor box used in the ice-fishing house of FIG. 1 from a top plan view.

The preferred floor box 60 has two circular hatches 63 in the horizontal surface that can be opened using hatch handles 64, as illustrated in FIG. 7. These hatches 63 are preferably located in the center laterally in the floor box 60 as well as some distance away from the front and back sides of floor box 60 in order to accommodate movement on any side, and fishing use on either of the lateral sides. Seat cushions 24 are preferably provided for more comfort for the fishermen. Alternative embodiments may have any number of hatches 63, located as desired by a particular designer or user. When not in use, hatches 63 may be closed and used as additional floor space, and will preferably easily support the weight of a person so that the entire floor may be safely traversed.

Figure 6:
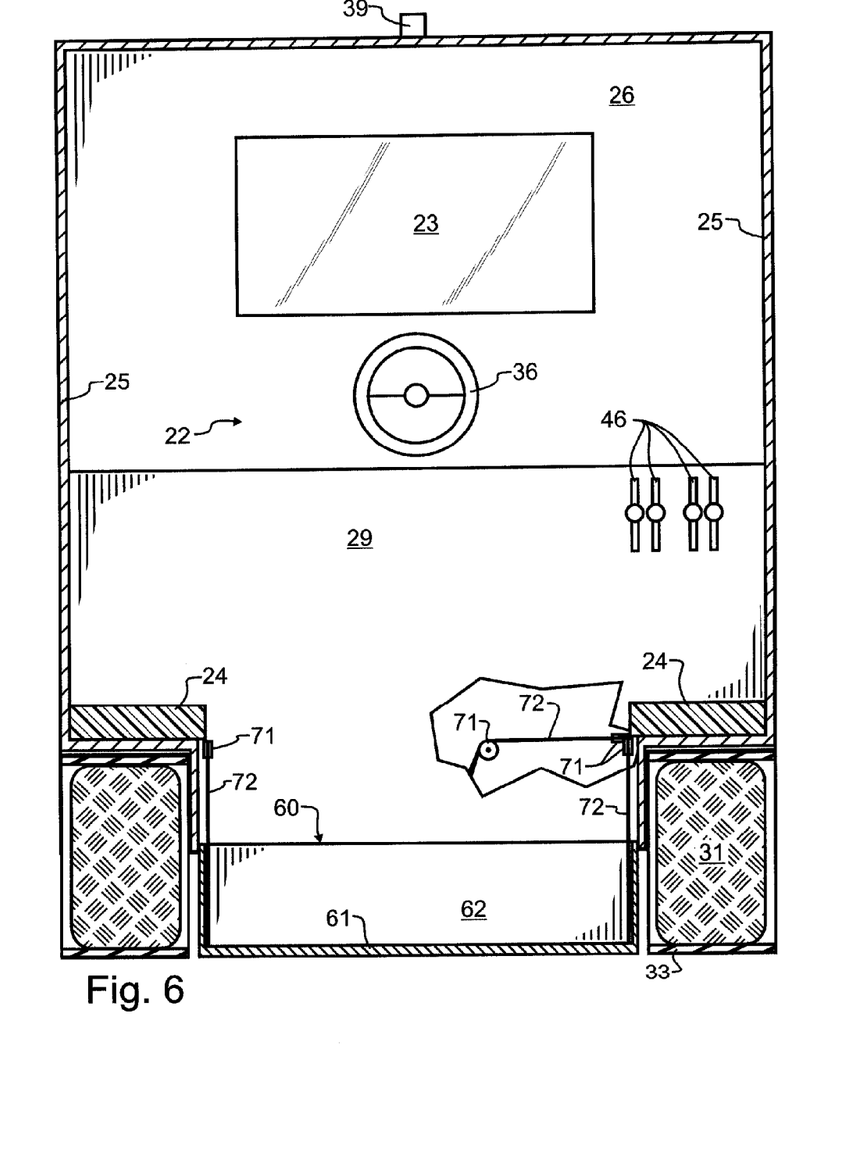
FIG. 6 illustrates the preferred embodiment ice-fishing house of FIG. 1 from a sectional view taken along section line 6' illustrated in FIG. 1.

Floor box 60 is preferably raised and lowered using a floor box drive assembly 70 comprising a set of pulleys 71 and cables 72, as best illustrated in FIGS. 6 and 7. There are preferably four cables 72, with one cable 72 for each corner of floor box 60, though the number and location of cables 72 is not critical to the present invention so long as they are able to safely and evenly raise and lower floor box 60. One of the cables 72 is preferably connected to each of the four separate corners of the floor box 60 on one end and to a pulley or post 73 on the other end. This post 73 is preferably turned by a motor 74, and as post 73 turns, cables 72 wind or unwind around post 73. As cables 72 are wound, floor box 60 raises, and as cables 72 are unwound, floor box 60 lowers. Motor 74 is preferably located in the front of ice-fishing house 10, and the back cables 72 may for exemplary purposes be directed along the side walls 62 of floor box 60 using horizontal pulleys 71. When a cable 72 has reached its respective corner, a vertical pulley 71 directs cable 72 vertically down to the corner of floor box 60 where it is then affixed. When so desired, various guides, tracks, bearings, slides or other suitable apparatus may be provided to keep floor box 60 in alignment during raising and lowering. Furthermore, other suitable apparatus may be used to raise and lower floor box 60, including but not limited to various hydraulic or direct electric drives or servos.

Preferred embodiment ice-fishing house 10 desirably has a control area 22 located in the forward interior, as illustrated in FIG. 6. Control area 22 preferably contains a steering mechanism 36, which preferably is a steering wheel but could also be a joystick or other suitable steering device. A knob may be provided on steering wheel 36 if so desired to provide additional gripping surfaces for a user. Levers 46 may provide additional control, adjusting factors such as speed, and preferably controlling auger 40. The engine cover 29 protects the user from the engine, dust and other materials, as well as adding safety and isolation for the user, while still providing access without exiting ice-fishing house 10. The engine is also located adjacent to body interior 21 and may also be used to convey heat body interior 21, adding to the user's comfort without requiring additional fuel. An exhaust pipe or stack 39 may optionally rise from the projected portion 28, or may be directed to any other suitable location.

In the preferred embodiment ice-fishing house 10 illustrated in FIGS. 1 and 2, a remote-controlled, hydraulically or electrically driven ice auger 40 is preferably affixed to the front exterior projected portion 28 of ice-fishing house 10, and may most preferably be located in or near to the center. A hydraulic or electric motor 41, which is lighter and oftentimes more durable than other power sources, is used to turn auger 40. The drive engine may be used to provide power for auger motor 41. The preferred central location of auger 40 allows the auger-drilled hole in the ice to line up with an ice-fishing hatch 63 simply by driving preferred embodiment ice-fishing house 10 forward, rather than having to line up holes on a different axis. This means the operator can drive to a location on the ice, control auger 40 using levers 46 to drill one or more ice holes, and drive forward. Consequently, the preferred interior levers 46 allow the user to stay inside the warm ice-fishing house 10 entirely from first entering house 10 prior to even leaving dry land to finally exiting house 10 after fishing and driving back to dry land. Additionally, the user does not need to let out valuable warm air by opening doors. In the ideal embodiment, two support bars 42 are affixed to ice-fishing house 10, and auger 40 is raised and lowered by a chain 43 powered by a chain motor 44. Two guide rollers 45 prevent the auger 40 from slipping laterally. Nevertheless, there are many other methods known to raise and lower an apparatus, including various screw, hydraulic, pneumatic and other drives.

From the foregoing figures and description, several additional features and options become more apparent. First of all, preferred embodiment ice-fishing house 10 may be manufactured from a variety of materials, including metals, resins and plastics, ceramics or cementitious materials, or even combinations, laminates or composites of the above. The specific material used may vary, though it is preferable that all materials are sufficiently tough and durable to not fracture, even when great forces are applied thereto, and that the materials are sufficiently weather resistant and durable to withstand the extremes of heat and cold that an ice-fishing house 10 may be exposed to. Finally, it is desirable that the preferred embodiment ice-fishing house 10 also be comprised of materials that are resistant to burning or combustion, to provide greater safety for the occupants.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

We claim:

1. A mobile ice-fishing house, comprising:
   a body defining a body interior and adapted to operatively isolate said body interior from an exterior of said body and thereby shelter a person within said body interior, said body having a vertically movable floor and controls within said body interior adapted to operatively control a vertical movement of said vertically movable floor;
   a drive train adapted to operatively move said ice fishing house between different and distinct locations upon an ice surface, said body having controls within said body interior adapted to operatively control a movement of said drive train; and
   an ice auger exterior to said body, said body having controls within said body interior adapted to operatively control a vertical movement of said ice auger.

2. The mobile ice-fishing house of claim 1, wherein said ice auger is located substantially along a central longitudinal axis of said body and said vertically movable floor has at least one port therein adapted to operatively access a hole formed through said ice surface by said auger when said ice fishing house is driven forward parallel to said central longitudinal axis.

3. The mobile ice-fishing house of claim 1, wherein said vertically movable floor further comprising an open-top box having a generally planar box base, and at least two generally planar box side walls generally perpendicular to said generally planar box base.

4. The mobile ice-fishing house of claim 3, wherein said body further comprises first and second body side walls generally parallel to said generally planar box side walls.

5. The mobile ice-fishing house of claim 4, wherein said first body side wall is immediately adjacent to a first one of said at least two generally planar box side walls.

6. The mobile ice-fishing house of claim 5, wherein said second body side wall is immediately adjacent to a second one of said at least two generally planer box side walls.

7. An ice-fishing house, comprising:
- a shelter for a person having side walls and a floor, said floor vertically adjustable relative to said side walls;
- a floor height adjustment control;
- a drive train coupled with said shelter to operatively move said shelter across an ice surface;
- a drive train movement control;
- an ice auger outside said shelter, said shelter housing controls adapted to operatively control a vertical movement of said ice auger; and
- at least one portal through said floor and adapted to operatively permit ice fishing through said portal.

8. The ice-fishing house of claim 7, wherein said ice auger is aligned with said portal along a line generally parallel to a forward direction of drive train movement.

9. The ice-fishing house of claim 7, wherein said floor further comprises an open-top box having a generally planar box base, and at least two generally planar box side walls generally perpendicular to said generally planar box base.

10. The ice-fishing house of claim 9, wherein said shelter further comprises first and second shelter side walls generally parallel to said generally planar box side walls.

* * * * *